United States Patent
Na et al.

(10) Patent No.: US 10,161,526 B2
(45) Date of Patent: Dec. 25, 2018

(54) VALVE FOR CONTROLLING COOLANT FLOW AND FUEL CELL COOLING SYSTEM USING THE SAME

(71) Applicants: Hyundai Motor Company, Seoul (KR); Kia Motors Corporation, Seoul (KR)

(72) Inventors: Sung Wook Na, Gyeonggi-do (KR); Hun Woo Park, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 91 days.

(21) Appl. No.: 15/215,944

(22) Filed: Jul. 21, 2016

(65) Prior Publication Data
US 2017/0191567 A1 Jul. 6, 2017

(30) Foreign Application Priority Data
Jan. 4, 2016 (KR) .................. 10-2016-0000300

(51) Int. Cl.
| | |
|---|---|
| *F16K 1/12* | (2006.01) |
| *F16K 1/36* | (2006.01) |
| *F16K 31/12* | (2006.01) |
| *H01M 8/04* | (2016.01) |
| *F16K 31/122* | (2006.01) |
| *H01M 8/04029* | (2016.01) |
| *H01M 8/04746* | (2016.01) |

(52) U.S. Cl.
CPC ............... *F16K 1/126* (2013.01); *F16K 1/36* (2013.01); *F16K 31/1221* (2013.01); *F16K 31/1223* (2013.01); *H01M 8/04029* (2013.01); *H01M 8/04768* (2013.01)

(58) Field of Classification Search
CPC .. F16K 1/126; F16K 31/1221; F16K 31/1223; F16K 15/025
See application file for complete search history.

(56) References Cited

U.S. PATENT DOCUMENTS

| | | | |
|---|---|---|---|
| 4,172,469 A * | 10/1979 | Boehringer | F16K 1/126 137/512.3 |
| 2010/0101666 A1* | 4/2010 | Pechtold | F16K 17/30 137/505 |
| 2011/0175009 A1* | 7/2011 | Kristoffersen | G05D 16/103 251/321 |

FOREIGN PATENT DOCUMENTS

| | | |
|---|---|---|
| JP | 2002-097957 A | 4/2002 |
| JP | 2007-294305 A | 11/2007 |
| JP | 2008-202624 A | 9/2008 |
| KR | 1999-0051103 | 7/1999 |
| KR | 20-0367231 Y1 | 11/2004 |
| KR | 10-2012-0062378 A | 6/2012 |

(Continued)

*Primary Examiner* — Matthew J Merkling
(74) *Attorney, Agent, or Firm* — Mintz Levin Cohn Ferris Glovsky and Popeo, P.C.; Peter F. Corless

(57) ABSTRACT

A mechanical valve for adjusting coolant flow which may be opened and closed based on the pressure of a coolant and a fuel cell cooling system using the same are provided. The valve has a mechanical valve structure to be opened and closed by the pressure of a coolant introduced into a coolant inlet and thus blocks and permits the coolant circulated to an ion filter line during operation of a fuel cell stack at the maximum output. The valve performs a coolant flow blocking function executed by a conventional electronic valve and thus a fuel cell cooling system has a simplified structure using the valve.

8 Claims, 5 Drawing Sheets

(56) References Cited

FOREIGN PATENT DOCUMENTS

KR 10-1504453 B1 3/2015
KR 2015-0078011 A 7/2015

* cited by examiner

[ DURING NORMAL OPERATION ]

[ DURING OPERATION AT MAXIMUM OUTPUT ]

VALVE FOR CONTROLLING COOLANT FLOW AND FUEL CELL COOLING SYSTEM USING THE SAME

CROSS-REFERENCE TO RELATED APPLICATION

This application claims under 35 U.S.C. § 119(a) the benefit of priority to Korean Patent Application No. 10-2016-0000300 filed on Jan. 4, 2016, the entire contents of which are incorporated herein by reference.

BACKGROUND (a) Technical Field

The present invention relates to a valve for controlling coolant flow and a fuel cell cooling system using the same, and more particularly, to a mechanical valve for controlling coolant flow, which may be opened and closed based on the pressure of a coolant, and a fuel cell cooling system using the same.

(b) Background Art

In general, a fuel cell stack that operates as a main power supply source of a fuel cell vehicle is a device configured to receive oxygen in air and hydrogen as a fuel and then generate electricity. The fuel cell stack stably exhibits the optimum output when a coolant, the temperature of which is optimally adjusted, is introduced into the stack and, thus, it is important to maintain the optimum temperature of the coolant introduced into the stack.

When the fuel cell stack is initially started, the amount of heating of the stack is minimal and, when the temperature of the coolant is low, the coolant flows along the following loop: a stack→a pump→a coolant control valve→the stack. Further, as time passes, when the amount of heating of the stack increases and the temperature of the coolant increase, a valve for adjusting coolant flow cuts off a bypass loop and, then, the coolant flows along the following loop: a stack-→the pump→a radiator→the coolant control valve→the stack.

The coolant control valve is an electronic valve configured to receive an inlet temperature signal of the stack, adjust the opening degree of the loop and cause the coolant having a constant temperature to be introduced into the stack regardless of external environments.

SUMMARY

The present invention provides a valve for adjusting coolant flow, which has a mechanical valve structure to be opened and closed by the pressure of a coolant introduced into a coolant inlet and may thus block and permit the coolant circulated to an ion filter line during operation of a fuel cell stack at the maximum output, and a fuel cell cooling system using the same.

In one aspect, the present invention provides a valve configured to adjust coolant flow that may include a valve housing having a coolant flow space between a coolant inlet and a coolant outlet, a valve body installed in the coolant flow space to be linearly movable by the flow pressure of the coolant introduced into the coolant inlet, and configured to move by the flow pressure of the coolant to close the coolant outlet, and a support spring disposed at the rear of the valve body in the coolant flow space to elastically support the valve body.

In an exemplary embodiment, the coolant flow space may include a central space part having a diameter that corresponds to the maximum diameter of the valve body, an introduction space part formed to connect the coolant inlet to the front region of the central space part, and a discharge space part formed to connect the rear region of the central space part to the coolant outlet, and the valve body may be installed in the central space part to be linearly movable. In addition, a protrusion to support the front end of the valve elastically supported by the support spring may be formed between the central space part and the introduction space part in the valve housing.

In another exemplary embodiment, a stepped part contacting the valve body moving backwards by the flow pressure of the coolant may be formed in the valve housing and may have a tapered shape in the flow direction of the coolant between the central space part and the discharge space part to block the flow of the coolant towards the coolant outlet by contact with the valve body. Further, a foil for flow distribution to radially distribute the coolant introduced through the coolant inlet may be formed at the front end of the valve body, a plurality of coolant apertures may be disposed outside the foil for flow distribution in the circumferential direction of the valve body, and the total cross-sectional area of the coolant holes may be greater than the cross-sectional area of the coolant inlet. A coolant blocking surface part contacting the stepped part when the valve body moves backwards may protrude from the rear end of the valve body, a rubber seal hermetically contacting the stepped part may be attached to the coolant blocking surface part, and a protrusion for preventing water leakage may protrude from the external diametral part of the rubber seal.

In another aspect, the present invention provides a fuel cell cooling system that may include a coolant circulation line formed between the front end of a fuel cell stack and the rear end of a radiator to cool a coolant supplied to the fuel cell stack, an ion filter line branched from the coolant circulation line and having an ion filter installed to remove ions from the coolant supplied from the radiator to the fuel cell stack, a coolant heating line branched from the coolant circulation line and having a heating unit installed to heat the coolant, a coolant distribution valve installed at a branch point among the coolant circulation line, the coolant heating line and the ion filter line to distribute the flow of the coolant discharged to the coolant circulation line and the coolant heating line, and a valve configured to adjust coolant flow installed between the rear end of the ion filter and the coolant distribution valve to be opened and closed by the flow pressure of the coolant.

In an exemplary embodiment, the coolant distribution valve may employ an electronic 4-way valve connected to a bypass line branched from a coolant cooling line formed between the rear end of the fuel cell stack and the front end of the radiator to receive the coolant introduced from the bypass line, and a water pump configured to feed the coolant flowing from the fuel cell stack to the radiator under pressure may be installed on the coolant cooling line.

In another exemplary embodiment, the valve configured to adjust coolant flow may include a valve body installed in a valve housing having a coolant flow space to be linearly movable by the flow pressure of the coolant and a support spring disposed in the valve housing to elastically support the valve body, the valve body may move backwards by the flow pressure of the coolant generated in the ion filter line during operation of the fuel cell stack at the maximum output and thus close the coolant outlet, and a coefficient of elasticity of the support spring may be set based on the flow pressure of the coolant generated in the ion filter line during operation of the fuel cell stack at a high output lower than at the maximum output.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
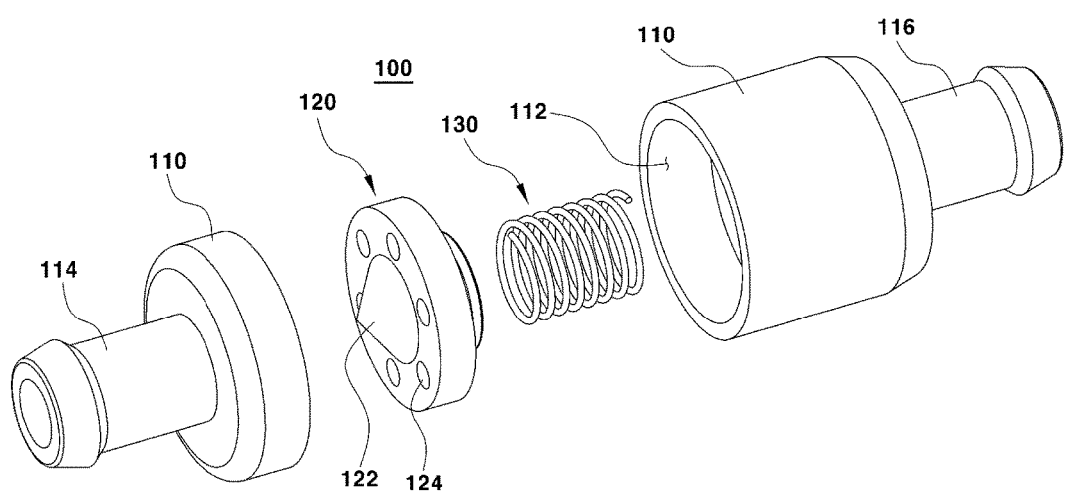
FIG. 1 is a detailed view of a valve for adjusting coolant flow in accordance with one exemplary embodiment of the present invention.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various exemplary embodiments of the present invention, examples of which are illustrated in the accompanying drawings and described below. While the invention will be described in conjunction with exemplary embodiments, it will be understood that the present description is not intended to limit the invention to the exemplary embodiments. On the contrary, the invention is intended to cover not only the exemplary embodiments, but also various alternatives, modifications, equivalents and other exemplary embodiments within the spirit and scope of the invention as defined by the appended claims.

Figure 2:
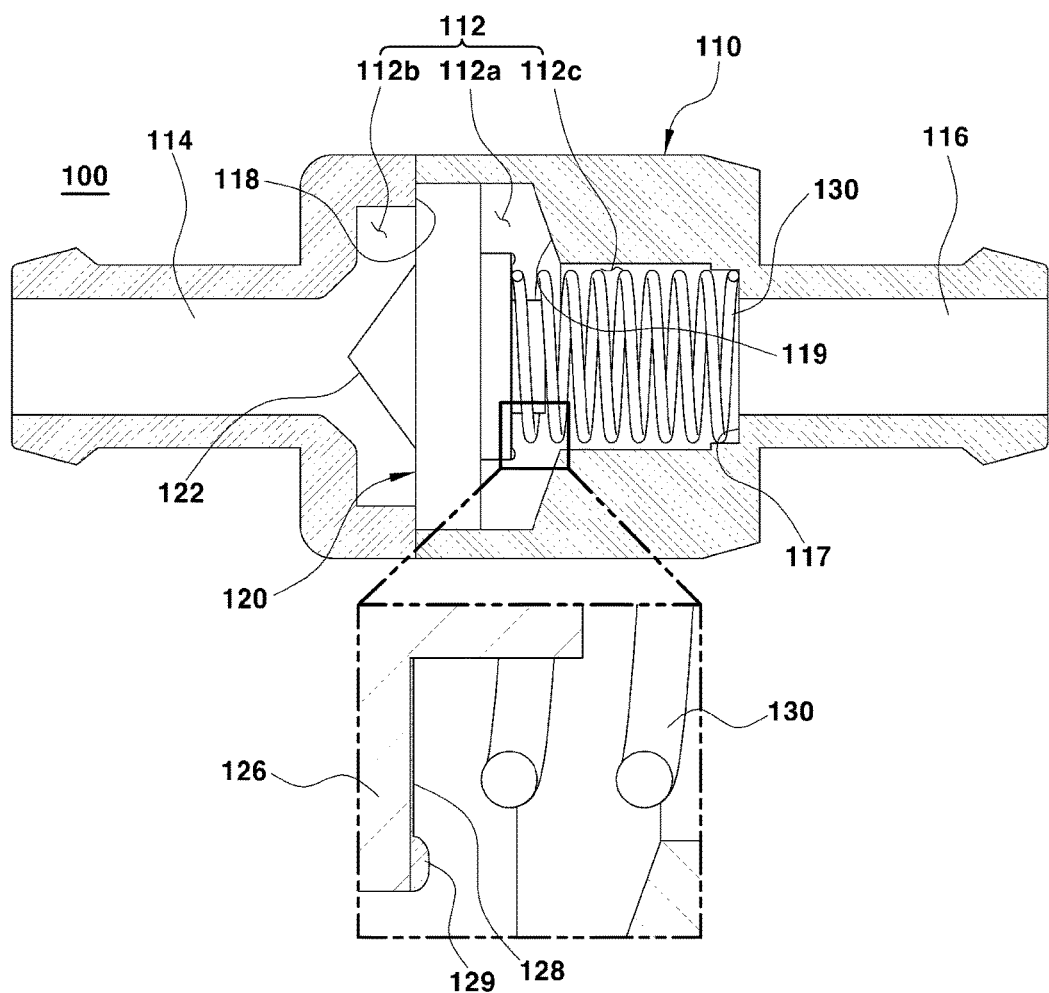
FIG. 2 is a cross-sectional view of the valve for adjusting coolant flow in accordance with the exemplary embodiment of the present invention.

As shown in FIGS. 1 and 2, a valve 100 for adjusting coolant flow in accordance with the present invention may include a valve housing 110 having a coolant flow space 112 formed therein, and a valve body 120 and a support spring 130 installed in the coolant flow space 112. A coolant inlet 114 to introduce a coolant into the valve housing 110 therethrough and a coolant outlet 116 to discharge the coolant to the outside therethrough may be formed at front and rear ends of the valve housing 110, and the coolant flow space 112, in which the coolant flows via the valve body 120, may be formed between the coolant inlet 114 and the coolant outlet 116.

The coolant flow space 112 may be broadly divided into three parts based on diameter. Specifically, the coolant flow space 112 may be divided into a central space part 112a having a largest diameter, a discharge space part 112c having a smallest diameter and an introduction space part 112b having an intermediate diameter between the diameters of the central space part 112a and the discharge space part 112c. The central space part 112a may have a diameter that corresponds to the maximum diameter of the valve body 120 and the valve body 120 may be pushed in the central space part 112a by the flow pressure of the coolant to linearly move in the flow direction of the coolant.

The introduction space part 112b may have a diameter smaller than the diameter of the central space part 112a, may be formed to connect the rear region of the coolant inlet 114 to the front region of the central space part 112a, and may include a protrusion 118 formed due to a diameter difference with the front region of the central space part 112a and thus the front end of the valve body 120 elastically supported by the support spring 130 may be caught by the protrusion 118 to not be outside the central space part 112a.

The discharge space part 112c may have a diameter smaller than the diameter of the introduction space part 112b, may be formed to connect the front region of the coolant outlet 116 to the rear region of the central space part 112a, and may include a stepped part 119 due to a diameter difference between the rear region of the central space part 112a and thus the valve body 120 may contact the stepped part 119 to cut off the flow of the coolant towards the coolant outlet 116. Particularly, the valve body 120 may contact the stepped part 119 in the circumferential direction of the stepped part 119, and the stepped part 119 may be formed to have an inclined surface having a gradient of a predetermined angle and thus has a tapered shape in the flow direction of the coolant.

The valve body 120 may be installed in the central space part 112a of the coolant flow space 112 to be linearly movable in the flow direction of the coolant, and may be configured to pass the coolant introduced into the coolant flow space 112 to flow towards the coolant outlet 116 or to block the coolant from flowing towards the coolant outlet 116. The valve body 120 may be configured to move backwards by the flow pressure of the coolant introduced into the coolant flow space 112 through the coolant inlet 114 or move forwards by elastic restoring force of the support spring 130 applied to the rear end of the valve body 120. In particular, since the flow pressure of the coolant and the elastic restoring force of the support spring 130 may be applied in offsetting directions to each other, the valve body 120 may be configured to move backwards when the flow pressure of the coolant is greater than the elastic restoring force and move forwards when the flow pressure of the coolant is less than the elastic restoring force. When the valve body 120 is pushed by the flow pressure of the coolant the valve body 120 may be configured to move in the flow direction of the coolant.

Figure 3:
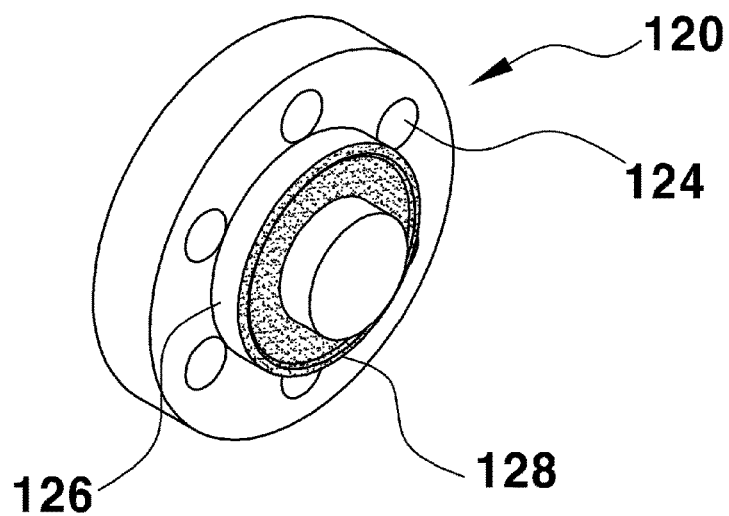
FIG. 3 is a rear perspective view illustrating a valve body of the valve for adjusting coolant flow in accordance with the exemplary embodiment of the present invention.

With reference to FIGS. 2 and 3, the valve body 120 is movable backwards by the flow pressure of the coolant and, to uniformly distribute and disperse the coolant introduced into the coolant flow space 112. Additionally, a conical foil 122 for flow distribution may protrude from the front end of the valve body 120 to radially distribute and disperse the coolant introduced through the coolant inlet 114.

In particular, the foil 122 for flow distribution formed at the front end of the valve body 120 may have a predetermined tilt angle with respect to the flow direction of the coolant introduced through the coolant inlet 114 and, thus the coolant entering the introduction space part 112b of the coolant flow space 112 may be uniformly distributed along the surface of the foil 122 for flow distribution and then may be dispersed to the edge of the valve body 120. The flow pressure of the coolant applied to the valve body 120 at the same flow rate may be varied by adjusting the tilt angle of the surface of the foil 122 for flow distribution. For example, as the tilt angle of the surface of the foil 122 for flow distribution increases, the flow pressure of the coolant applied to the surface of the foil 122 for flow distribution at the same flow rate decreases.

Further, the valve body 120 may be inserted into the central space part 112a of the coolant flow space 112 to closely contact (e.g., abut) the inner surface of the central space part 112a to be linearly movable and, thus, to pass the coolant, a plurality of coolant apertures 124 may be formed at the edge of the valve body 120. The coolant apertures 124 spaced from each other at designated intervals may be formed extraneous to the foil 122 for flow distribution in the circumferential direction of the valve body 120 and the total cross-sectional area of the coolant apertures 124 may be set to be greater than the cross-sectional area of the coolant inlet 114.

In particular, since the coolant passing through the coolant apertures 124 has friction loss, the sum of the cross-sectional areas of the respective coolant apertures 124 may be set to be greater than the cross-sectional area of the coolant inlet 114. Further, a coolant blocking surface part 126 configured to block or permit the discharge flow of the coolant may protrude from the rear end of the valve body 120 in the flow direction of the coolant.

The coolant blocking surface part 126 may contact the stepped part 119 of the coolant flow space 112 by the flow pressure of the coolant or may be separated from the stepped part 119 by the elastic restoring force of the support spring 130, thereby blocking or permitting the flow of the coolant towards the coolant outlet 116. In particular, the coolant blocking surface part 126 may protrude backwards from the valve body 120 opposite the foil 122 for flow distribution and, to prevent disturbance to the flow of the coolant passing through the coolant apertures 124 by the coolant blocking surface part 126, the coolant apertures 124 may be formed extraneous to the coolant blocking surface part 126.

A rubber seal 128 hermetically contacting the steppe part 119 may be attached to the rear end surface of the coolant blocking surface part 126, i.e., the rear end surface of the coolant blocking surface part 126 hermetically contacting the stepped part 119 of the coolant flow space 112 when discharge of the coolant is blocked. The rubber seal 128 may be formed of an elastic material, such as rubber, and a protrusion 129 configured to prevent water leakage may protrude from the external diametral part of the rubber seal 128 to increase closeness of contact between the coolant blocking surface 126 and the stepped part 119 and thus to increase coolant flow blocking effects.

Further, the support spring 130 may be configured to elastically support the valve body 120 linearly movable by the flow pressure of the coolant, may be disposed in the discharge space part 112c of the coolant flow space 12, and may be disposed at the rear of the valve body 120 in the flow direction of the coolant to elastically support the rear end of the valve body 120. A first end of the support spring 130 may be stacked on and supported by the coolant blocking surface part 126 of the valve body 120 and a second end of the support spring 130 may be stacked on and supported by a spring fixing protrusion 117 formed by a diameter difference between the discharge space part 112c and the coolant outlet 116. In particular, the support spring 130 may be supported between the coolant blocking surface part 126 and the spring fixing protrusion 117 of the discharge space part 112c, and may be configured to push (e.g., exert force onto) the valve body 120 forwards to open the coolant outlet 116, when elastic restoring force greater than the flow pressure of the coolant is generated.

Figure 4A:
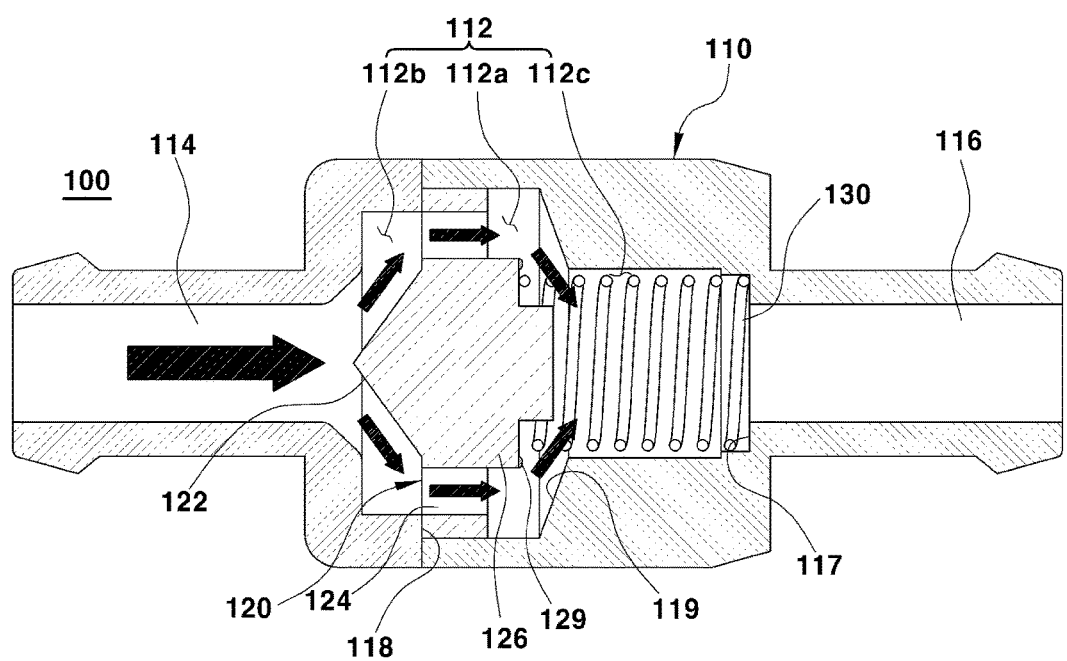
FIGS. 4A and 4B are cross-sectional views illustrating states of the valve for adjusting coolant flow in accordance with the exemplary embodiment of the present invention during operation at the maximum output and during normal operation.
Figure 4B:
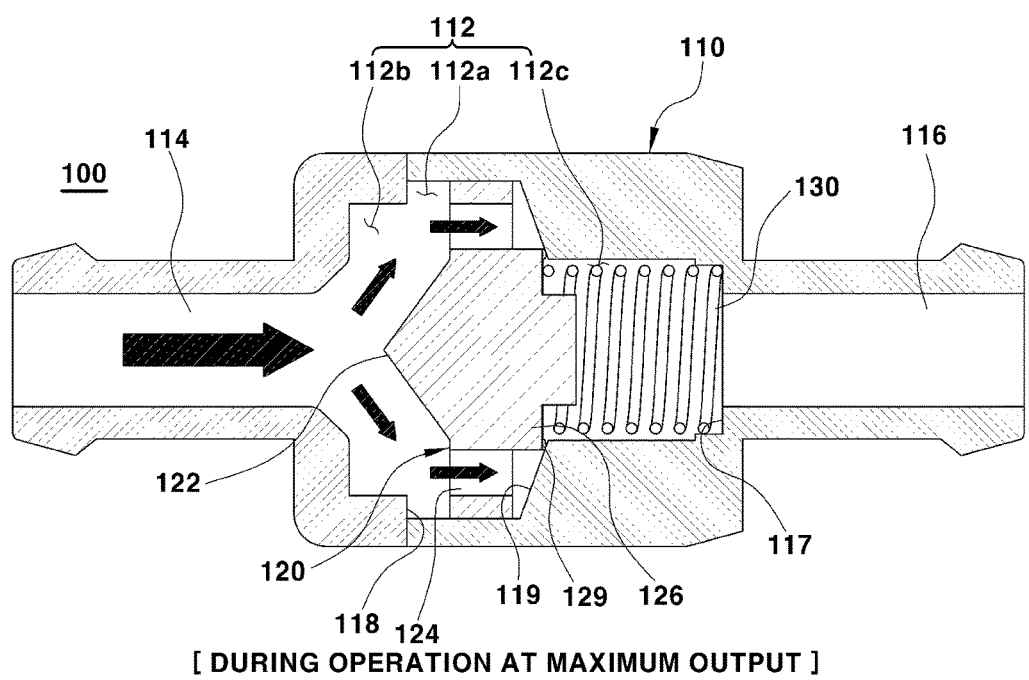

As shown in FIGS. 4A and 4B, when the valve body 120 moves backwards by the flow pressure of the coolant and thus contacts the stepped part 119 of the coolant flow space 112, the valve body 120 may be configured to close the coolant outlet 116 to prevent discharge of the coolant. When the flow pressure of the coolant decreases and the valve body 120 moves forwards by the elastic restoring force of the support spring 130 and is separated from the stepped part 119, the valve body 120 may be configured to open the coolant outlet 116 to discharge the coolant.

Furthermore, when the coolant outlet 116 is opened by the valve body 120, the coolant entering the introduction space part 112b of the coolant flow space 112 through the coolant inlet 114 may be radially dispersed along the foil 122 for flow distribution of the valve body 120, may flow towards the central space part 112a, passes through the coolant apertures 124 of the valve body 120 in the central space part 112a, may enter the discharge space part 112c through a gap between the coolant blocking surface 126 and the stepped part 119 of the central space part 112a, and may flow to the outside of the valve housing 110 through the coolant outlet 116.

Additionally, when the coolant outlet 116 is closed by the valve body 120, the valve body 120 linearly moves and is pushed to the rear end of the central space part 112a by force of pushing the foil 122 for flow distribution of the valve body 120 by the coolant entering the introduction space part 112b of the coolant flow space 112 and, as a result, the rubber seal 128 of the coolant blocking surface part 126 may contact the stepped part 119 and the flow of the coolant between the central space part 112a and the discharge space part 112c may be blocked.

In the valve 100 for adjusting coolant flow having the above configuration, the coolant outlet 116 may be opened or closed by a variation of the flow pressure of the coolant introduced from the coolant inlet 114 and applied to the front end of the valve body 120, and forward or backward movement of the valve body 120 and opening or closing the coolant outlet 116 based on the movement may be determined by a difference between the flow pressure of the coolant and the elastic restoring force of the support spring 130.

Figure 5:
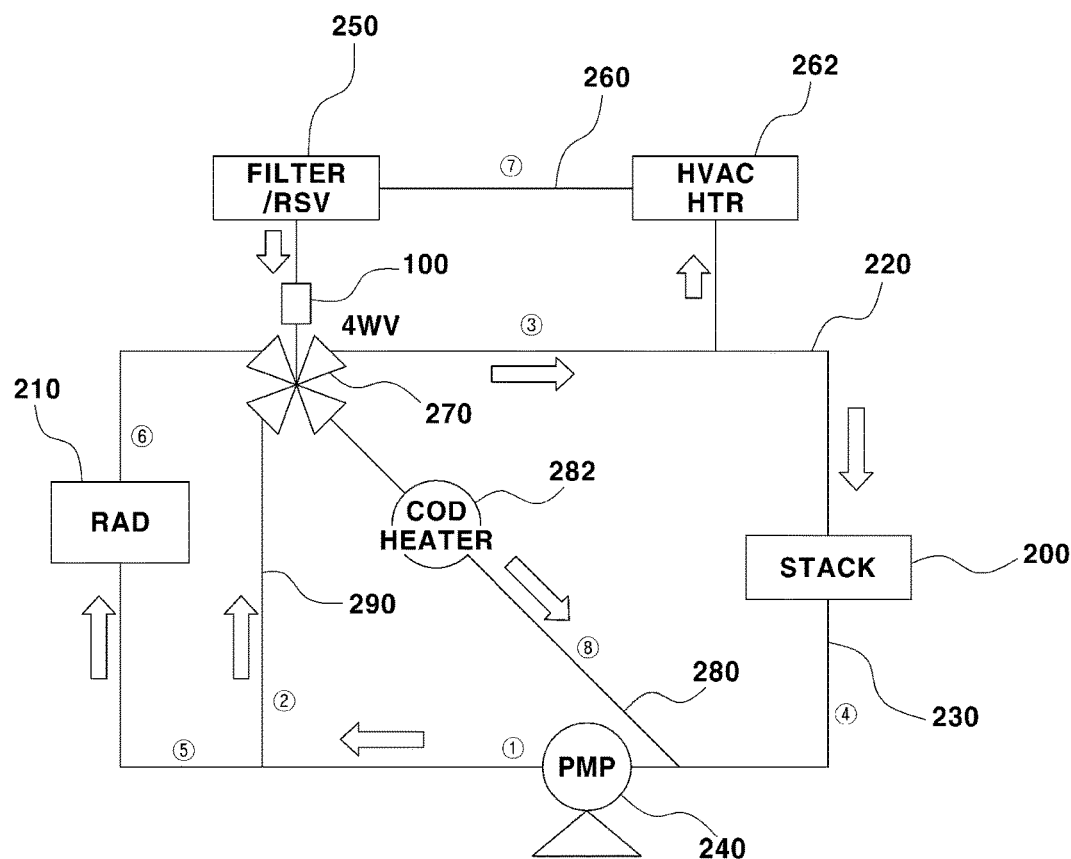
FIG. 5 is a diagram illustrating a fuel cell cooling system using a valve for adjusting coolant flow in accordance with one exemplary embodiment of the present invention.

Moreover, a fuel cell cooling system using the above-described valve 100 for adjusting coolant flow will be described with reference to FIG. 5. As shown in FIG. 5, when a fuel cell cooling system is configured using the above-described valve 100 for adjusting coolant flow, the fuel cell cooling system may have a simplified structure including a radiator 210 configured to cool the coolant by radiating heat from the coolant to the outside, a coolant circulation line 220 formed between the radiator 210 and a fuel cell stack 200 to circulate the coolant, a coolant cooling line 230 to form flow of the coolant discharged from the fuel cell stack 200 and supplied to the radiator 210, an ion filter line 260 having an ion filter 250 installed thereon to remove ions from the coolant supplied from the radiator 210 to the fuel cell stack 200, a coolant distribution valve 270 installed at a branch point between the coolant circulation line 220 and the ion filter line 260 to distribute the flow of the coolant, and the valve 100 configured to adjust coolant flow installed between the rear end of the ion filter 250 and the coolant distribution valve 270 to be opened and closed by the flow pressure of the coolant.

The coolant cooling line 230 may be formed between the rear end of the fuel cell stack 200 and the front end of the radiator 210 and thus may cause the coolant discharged from the fuel cell stack 200 to be introduced into the radiator 210. The coolant circulation line 220 may be formed between the rear end of the radiator 210 and the front end of the fuel cell stack 200 and thus may cause the coolant from the radiator 210 to be circulated to the fuel cell stack 200. The front end of the ion filter line 260 to introduce the coolant thereinto is branched from the coolant circulation line 220 and the rear end of the ion filter line 260 to discharge the coolant therefrom may be connected to the coolant distribution valve 270. Further, the coolant introduced into the ion filter line 260 may be supplied to the ion filter 250 via a heater 262 for a heating, ventilating, and air-conditioning (HVAC) system connected to the front end of the ion filter 250.

The fuel cell cooling system may further include a coolant heating line 280, a bypass line 290, and a water pump 240. The coolant heating line 280 may be a coolant flow line having a heating unit 282 used to heat the coolant during cold starting. The coolant heating line 280 may be branched from the coolant circulation line 220, the front end of the heating unit 282 may be connected to the coolant distribution valve 270 and the rear end of the heating unit 282 may be connected to the coolant cooling line 230.

The bypass line 290 may be a coolant flow line that allows the coolant to selectively bypass the radiator 210 to prevent the coolant, discharged from the fuel cell stack 200 towards the radiator 210, from passing through the radiator 210. The bypass line 290 may be branched from the coolant cooling line 230 for flow of the coolant supplied from the fuel cell stack 200 to the radiator 210 and may be connected to the coolant distribution valve 270. Further, the water pump 240 may be configured to feed the coolant discharged from the fuel cell stack 200 to the radiator 210 under pressure. The water pump 240 may be installed on the coolant cooling line 230, and more particularly, on the coolant cooling line 230 to be disposed between the rear end of the heating unit 282 and the front end of the bypass line 290.

The coolant distribution valve 270 may be an electronic 4-way valve configured to distribute the flow of the coolant introduced into the coolant distribution valve 270 based on a control signal from a controller (not shown) mounted to operate the fuel cell cooling system, and the controller may be configured to transmit a control signal to the coolant distribution valve 270 in consideration of operation conditions, such as operation of a system temperature, removal of ions from the coolant, adjustment of a flow rate of the coolant passing through the heating unit 282, cold starting, etc.

The coolant distribution valve 270 may be installed at a branch point among the coolant circulation line 220, the coolant heating line 280, the ion filter line 260 and the bypass line 290, and, accordingly, the coolant introduced into the coolant distribution valve 270 through the coolant circulation line 220 and the bypass line 290 may be discharged to the coolant circulation line 220 and the coolant heating line 280, and the coolant discharged from the coolant distribution valve 270 may be supplied to the fuel cell stack 200 through the coolant circulation line 220, supplied to the ion filter 250 through the ion filter line 260, or supplied to the heating unit 282 through the coolant heating line 280.

Further, the coolant introduced into the coolant distribution valve 270 may be introduced into the coolant distribution valve 270 through the bypass line 290, the rear end of the radiator 210, or the rear end of the ion filter 250. The fuel cell cooling system having the above-described configuration may have different coolant flow paths based on operation modes, i.e., in the early stage of starting, during normal operation, during operation at a high output, during operation at the maximum output, and during cold starting.

In the early stage of starting of the fuel cell cooling system, the amount of heating of the fuel cell stack 200 may be minimal and the temperature of the coolant may be relatively low and, thus, the coolant circulated to the fuel cell stack 200 need not pass through the radiator 210. Therefore, in the early stage of starting, the coolant may flow along the following loop: the stack 200→the water pump 240→the coolant distribution valve 270→the stack 200. Additionally, the coolant may flow to the ion filter line 260. In other words, in the early stage of starting, the coolant may form a flow line of ①→②→③→④ and form a flow line of ⑦ in FIG. 5.

Thereafter, during operation of the fuel cell cooling system after the early stage of starting, the coolant selectively bypasses the radiator 210 not to pass through the radiator 210 based on the temperature of the coolant. Therefore, during normal operation, the coolant may flow along the following loop: the fuel cell stack 200→the water pump 240→the bypass line 290→the stack 200 or the fuel cell stack 200→the water pump 240→the radiator 210→the coolant distribution valve 270→the stack 200. The coolant may also flow to the ion filter line 260. In other words, during operation, the coolant may form a flow line of ①→②→③→④ or a flow line of ①→⑤→⑥→③→④ and form a flow line of ⑦ in FIG. 5.

Thereafter, during operation of the fuel cell cooling system at a high output, the amount of heating of the fuel cell stack 200 may be substantial (e.g. large) and the temperature of the coolant may be high and, thus, the coolant needs to pass through the radiator 210 to decrease the temperature of the coolant. Therefore, during operation at the high output, the coolant may flow along the following loop: the fuel cell stack 200→the water pump 240→the radiator 210→the coolant distribution valve 270→the stack 200. The coolant may also flow to the ion filter line 260. In other words, during operation at the high output, the coolant may form a flow line of ①→⑤→⑥→③→④ and form a flow line of ⑦ in FIG. 5.

Thereafter, during operation of the fuel cell cooling system at the maximum output, the temperature of the coolant of the fuel cell stack 200 may be excessively high and, thus, introduction of the coolant into the ion filter line 260 needs to be blocked simultaneously with decreasing the temperature of the coolant through the radiator 210. Therefore, during operation at the maximum output, the coolant may flow only along the following loop: the fuel cell stack 200→the water pump 240→the radiator 210→the coolant distribution valve 270→the stack 200. In other words, during operation at the maximum output, the coolant may form only a flow line of ①→⑤→⑥→③→④ in FIG. 5.

Thereafter, during cold starting of the fuel cell cooling system, to perform effective starting, the temperature of the coolant supplied to the fuel cell stack 200 needs to be increased. Therefore, during cold starting, the coolant may flow along the following loop: the fuel cell stack 200→the bypass line 290→the heating unit 282. In other words, during cold starting, the coolant may form a flow line of ①→②→⑧ in FIG. 5. Particularly, whether the flow of the coolant branched from the coolant circulation line 220 towards the ion filter line 260 and the flow of the coolant from the ion filter line 260 to the coolant distribution valve 270 are performed may be determined by the opening and closing operation of the valve 100 for adjusting coolant flow installed between the rear end of the ion filter 250 and the coolant distribution valve 270.

In the valve 100 for adjusting coolant flow, the valve body 120 may be configured to move linearly by a set coefficient of elasticity of the support spring 130 and the flow pressure of the coolant, and, thus, opening or closing of the coolant outlet 116 may be determined. Therefore, the coefficient of elasticity of the support spring 130 may be set to cause the valve body 120 to move backwards by the flow pressure of the coolant during the operation of the fuel cell stack 200 at the maximum output to close the coolant outlet 116 and, thus, during operation of the fuel cell cooling system at the maximum output, the above-described coolant flow line may be formed.

In particular, the valve 100 for adjusting coolant flow may be closed by the flow pressure of the coolant generated in the ion filter line 260 during operation of the fuel cell stack 200 at the maximum output and, accordingly, during operation at the maximum output, the coolant may flow only along the following loop: the fuel cell stack 200→the water pump 240→the radiator 210→the coolant distribution valve 270→the stack 200. Additionally, flow of the coolant to the ion filter line 260 may be blocked.

The coefficient of elasticity (k) of the support spring 130 may be set by Equation 1 below based on the flow pressure (P) of the coolant generated in the ion filter line 260 during operation of the fuel cell stack 200 at a high output which is less than at the maximum output of the fuel cell stack 200.

$$k = \frac{P}{\delta} = \frac{Gd^4}{8NaD^3} \qquad \text{Equation 1}$$

wherein, k indicates a coefficient of elasticity of the support spring 130, P indicates a flow pressure of the coolant applied to the ion filter line 260 during operation of the fuel cell stack 200 at a high output, G indicates a coefficient of lateral elasticity of the support spring 130, d indicates a wire diameter of the support spring 130, Na indicates an effective winding number of the support spring 130, D indicates a mean diameter of the support spring 130, and δ indicates an amount of deformation of the support spring 130.

By setting the coefficient of elasticity of the support spring 130 as described above, the coolant may flow to the ion filter line 260 without generation of a differential pressure by the valve 100 for adjusting coolant flow in the open state during normal operation of the fuel cell stack 200 except operation of the fuel cell stack 200 at the maximum output, and particularly, during normal operation, such as in the initial stage of starting, during normal operation, during operation at a high output, during cold starting, etc., and the valve body 120 may be configured to move backwards and may be pushed towards the coolant outlet 116 of the valve housing 110 during operation of the fuel cell stack 200 at the maximum output (with reference to FIG. 4).

As the valve body 120 is pushed towards the coolant outlet 116, the flow rate of the coolant flowing to the ion filter line 260 may be gradually decreased, and the flow rate of the coolant flowing along the stack cooling loop (the flow line of ①→⑤→⑥→③→④ in FIG. 5) may be increased, and, when the valve body 120 contacts the stepped part 119 of the valve housing 110 and blocks the flow of the coolant towards the coolant outlet 116, the flow of the coolant towards the ion filter line 260 may be completely blocked and accordingly the flow rate of the coolant along the stack cooling loop (the flow line of ①→⑤→⑥→③→④ in FIG. 5) at the same operation conditions of the water pump 240 may be increased.

Particularly, as the output of the fuel cell stack 200 is increased from the operation state at the high output to the operation state at the maximum output, the flow pressure of the coolant may be increased and the valve 100 for adjusting coolant flow is in the closed state. Accordingly, the flow of the coolant to the ion filter line 260 may be blocked, the coolant may flow only along the stack cooling loop (the flow line of ①→⑤→⑥→③→④ in FIG. 5) and, thus, the flow rate of the coolant along the stack cooling loop (the flow line of ①→⑤→⑥→③→④ in FIG. 5) may be increased and cooling performance of the fuel cell stack 200 may be improved.

As is apparent from the above description, a valve for adjusting coolant flow in accordance with the present invention is a mechanical valve which may be opened by the flow pressure of a coolant generated in an ion filter line during operation of a fuel cell stack at the maximum output and, thus the valve for adjusting coolant flow may perform a coolant flow blocking function, which is executed by a conventional electronic valve, and thus a fuel cell cooling system having a simplified structure using the valve for controlling coolant flow may be constructed.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A valve for controlling coolant flow, comprising:
a valve housing having a coolant flow space between a coolant inlet and a coolant outlet;
a valve body installed in the coolant flow space to be linearly movable by the flow pressure of the coolant introduced into the coolant inlet, and configured to move by the flow pressure of the coolant to close the coolant outlet; and
a support spring disposed at the rear of the valve body in the coolant flow space to elastically support the valve body,
wherein a stepped part contacting the valve body moving backwards by the flow pressure of the coolant is formed in the valve housing to block the flow of the coolant towards the coolant outlet by contact with the valve body.

2. The valve for controlling coolant flow of claim 1, wherein the coolant flow space includes:
a central space part having a diameter that corresponds to the maximum diameter of the valve body;
an introduction space part formed to connect the coolant inlet to the front region of the central space part; and
a discharge space part formed to connect the rear region of the central space part to the coolant outlet,
wherein the valve body is installed in the central space part to be linearly movable.

3. The valve for controlling coolant flow of claim 2, wherein a protrusion to support the front end of the valve body elastically supported by the support spring is formed between the central space part and the introduction space part in the valve housing.

4. The valve for controlling coolant flow of claim 1, wherein the stepped part has a tapered shape in the flow direction of the coolant between the central space part and the discharge space part.

5. The valve for controlling coolant flow of claim 1, wherein a foil for flow distribution to radially distribute the coolant introduced through the coolant inlet is formed at the front end of the valve body, and a plurality of coolant apertures are disposed outside the foil for flow distribution in the circumferential direction of the valve body.

6. The valve for controlling coolant flow of claim 5, wherein the total cross-sectional area of the coolant apertures is greater than the cross-sectional area of the coolant inlet.

7. The valve for controlling coolant flow of claim 4, wherein a coolant blocking surface part contacting the stepped part when the valve body moves backwards protrudes from the rear end of the valve body, and a rubber seal hermetically contacting the stepped part is attached to the coolant blocking surface part.

8. The valve for controlling coolant flow of claim 7, wherein a protrusion for preventing water leakage protrudes from the external diametral part of the rubber seal.

* * * * *